(12) United States Patent
Medra et al.

(10) Patent No.: US 11,770,276 B1
(45) Date of Patent: Sep. 26, 2023

(54) SYSTEMS AND METHODS FOR COMPENSATING POLARIZATION DEPENDENT LOSS (PDL) IN DUAL POLARIZED COMMUNICATION NETWORK

(71) Applicant: HUAWEI TECHNOLOGIES CO., LTD., Guangdong (CN)

(72) Inventors: Ahmed Mohamed Medra, Kanata (CA); Hossein Najafi, Kanata (CA); Ali Bakhshali, Stittsville (CA); Jin Wang, Kanata (CA); Chuandong Li, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/962,060

(22) Filed: Oct. 7, 2022

(51) Int. Cl.
*H04L 25/03* (2006.01)
*H04B 7/10* (2017.01)

(52) U.S. Cl.
CPC .......... *H04L 25/03057* (2013.01); *H04B 7/10* (2013.01)

(58) Field of Classification Search
CPC ................ H04B 7/10; H04L 25/03057; H04L 25/03006
USPC .......................................................... 375/233
See application file for complete search history.

(56) References Cited

U.S. PATENT DOCUMENTS 5,327,458 A * 7/1994 Yamamoto ............. H04B 7/002 375/267
5,692,011 A * 11/1997 Nobakht ............. H04L 25/0307 375/348
9,183,877 B1 * 11/2015 Chen ................ G11B 20/10268

OTHER PUBLICATIONS

S. Mumtaz, G. Rekaya-Ben Othman, and Y. Jaouen, "Space-time codes for optical fiber communication with polarization multiplexing", in 2010 IEEE International Conference on Communications, 2010, pp. 1-5. DOI: 10. 1109/ ICC.2010.5502528.

M. Zamani, C. Li, and Z. Zhang, "Polarization-time code and 4×4 equalizer decoder for coherent optical transmission", IEEE Photonics Technology Letters, vol. 24, No. 20, pp. 1815-1818, 2012. DOI: 10.1109/LPT.2012.2216259.

J.-C. Belfiore, G. Rekaya, and E. Viterbo, "The golden code: A 2×2 full-rate space-time code with non-vanishing determinants", in International Symposium on Information Theory, 2004. ISIT 2004. Proceedings., 2004, pp. 310-310. DOI: 10 . 1109 / ISIT . 2004 . 1365347.

(Continued)

*Primary Examiner* — Leila Malek
(74) *Attorney, Agent, or Firm* — BCF LLP

(57) ABSTRACT

The disclosed systems and methods for compensating the polarization dependent loss (PDL) in communication networks comprising: i) filtering, by a first feed-forward filter, a current set of symbols in an equalized X-Pol signal; ii) filtering, by a second feed-forward filter, a current set of symbols in an equalized Y-Pol signal; iii) filtering, by a first feed-backward filter, a previously decided set of symbols associated with the equalized X-Pol signal; iv) filtering, by a second feed-backward filter a previously decided set of symbols associated with the equalized Y-Pol signal; v) adding, by a first adder, the outputs from the first feed-forward filter and the second feed-forward filter; and vi) subtracting, by the first adder, the outputs from the first feed-backward filter and the second feed-backward filter from the addition of outputs from the first feed-forward filter and the second feed-forward filter to determine the symbols in the equalized X-Pol signal.

20 Claims, 8 Drawing Sheets

(56) References Cited

OTHER PUBLICATIONS

G. Huang, H. Nakashima, Y. Akiyama, Z. Tao, and T. Hoshida, "Polarization dependent loss mitigation technologies for digital coherent system", in Metro and Data Center Optical Networks and Short-Reach Links III, International Society for Optics and Photonics, vol. 11308, SPIE, 2020, pp. 125-131. DOI: 10 . 1117 / 12 . 2544576. [Online]. Available: https://doi.org/10.1117/12.2544576.

W.-R. Peng, T. Tsuritani, and I. Morita, "Modified Walsh-Hadamard transform for PDL mitigation", in 39th European Conference and Exhibition on Optical Communication (ECOC 2013), 2013, pp. 1-3. DOI: 10 . 1049 / cp . 2013.1593.

M. Zamani, Z. Zhang, C. Chen, and C. Li, "PDL compensation using whitening matrix in polarization division multiplexed coherent optical transmission", in 2013 Optical Fiber Communication Conference and Exposition and the National FiberOptic Engineers Conference (OFC/NFOEC), 2013, pp. 1-3. DOI: 10.1364/NFOEC.2013.JW2A.49.

H. Ebrahimzad, H. Khoshnevis, D. Chang, C. Li, and Z. Zhang, "Low-PAPR PolarizationTime Code with improved four-dimensional detection for PDL mitigation", in 2020 European Conference on Optical Communications (ECOC), 2020, pp. 1-3. DOI: 10.1109/ ECOC48923.2020.9333262.

\* cited by examiner

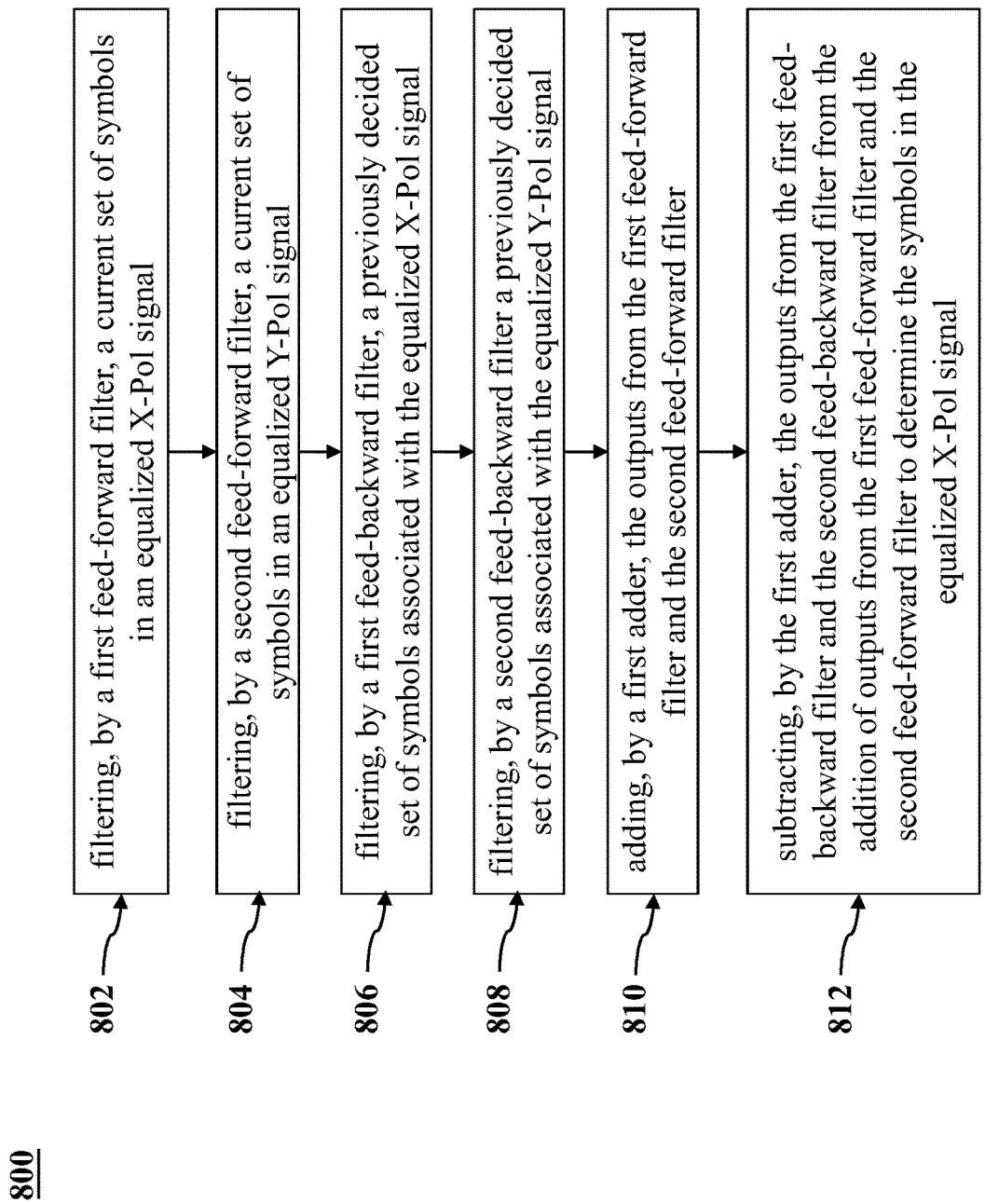

SYSTEMS AND METHODS FOR COMPENSATING POLARIZATION DEPENDENT LOSS (PDL) IN DUAL POLARIZED COMMUNICATION NETWORK

CROSS-REFERENCE TO RELATED APPLICATIONS

This is the first application filed for the instantly disclosed technology.

TECHNICAL FIELD

The present disclosure generally relates to digital communications and, in particular, to a system and a method for compensating the polarization dependent loss (PDL) in dual polarized communication networks.

BACKGROUND

Generally, optical networks transmit polarization multiplexed signals, in which X-polarized signals and Y-polarized signals are sent together with the same average power. During signal transmission, the dual polarized signal passes through several components, such as Erbium-Doped Fiber amplifiers (EDFAs) and Wavelength Selective Switches (WSSs), which can give different gains to X-pol signal or Y-pol signal and hence there exists a power imbalance between the two polarizations. This is referred to as polarization dependent loss (PDL). The impact of PDL depends on the incident state-of-polarization (SOP) angle. In the presence of several PDL contributing components, the aggregate channel may result in large PDL (up to 6 dB).

At the receiver side, the gain imbalance between the X-polarized signal and Y-polarized signal results in one polarization signal having better quality, for example, better signal-to-noise ratio (SNR) and lower bit-error-rate (BER), compared to the other polarization signal. The system performance is dominated by the performance of the weakest (i.e., least quality) polarized signal, resulting in performance losses, depending on the amount of PDL occurred in the network.

With this said, there is an interest in developing systems and methods for compensating the polarization dependent loss (PDL) in dual polarized communication networks in an efficient manner.

SUMMARY

In general, the conventional PDL mitigation techniques may be classified into two main categories: i) transmitter PDL precoding, and ii) receiver post processing. In the first PDL mitigation category, signal precoding is applied using the same principles of space-time coding used in wireless communications. In the second PDL mitigation category, receiver post-processing techniques are employed. The techniques in the second PDL mitigation aim to whiten the space-time correlated noise generated as a result of adaptive equalization in the presence of PDL.

The performance gains from the noted conventional techniques are not significant and PDL still represents a limiting issue for long-haul optical communication system. Transmitter PDL precoding schemes cannot improve the system performance at all incident state-of-polarization angles. Also, at the receiver side after adaptive equalization, the noise exhibits temporal and spatial (polarization) correlation that degrades the system performance in terms of SNR and BER. Moreover, colored noise affects the performance of forward-error-correction (FEC) decoding, leading to Pre-FEC BER degradation.

Developers of the present technology have devised systems and methods for compensating the polarization dependent loss (PDL) in dual polarized communication networks in an efficient manner.

In accordance with a first broad aspect of the present disclosure, there is provided a communication system comprising: a modified decision feedback equalizer (DFE), the modified DFE comprising a first path including: a first feed-forward filter configured to filter a current set of symbols in an equalized X-Pol signal; a second feed-forward filter configured to filter a current set of symbols in an equalized Y-Pol signal; a first feed-backward filter configured to filter a previously decided set of symbols associated with the equalized X-Pol signal; a second feed-backward filter configured to filter a previously decided set of symbols associated with the equalized Y-Pol signal; and a first adder configured to add the outputs from the first feed-forward filter and the second feed-forward filter and subtract the outputs from the first feed-backward filter and the second feed-backward filter to determine the symbols in the equalized X-Pol signal.

In accordance with any embodiments of the present disclosure, the modified DFE further comprises: a second path comprising: a third feed-forward filter configured to filter the current set of symbols in the equalized Y-Pol signal; a fourth feed-forward filter configured to filter the current set of symbols in an equalized X-Pol signal; a third feed-backward filter configured to filter the previously decided set of symbols associated with the equalized Y-Pol signal; a fourth feed-backward filter configured to filter the previously decided set of symbols associated with the equalized X-Pol signal; and a second adder configured to add outputs from the third feed-forward filter and the fourth feed-forward filter and subtract outputs from the third feed-backward filter and the fourth feed-backward filter to determine the symbols in the equalized Y-Pol signal.

In accordance with any embodiments of the present disclosure, the first feed-forward filter and the third feed-forward filter are initialized with same filter coefficients.

In accordance with any embodiments of the present disclosure, the second feed-forward filter and the fourth feed-forward filter are initialized with same filter coefficients.

In accordance with any embodiments of the present disclosure, initial filter coefficients of the first feed-forward filter and the third feed-forward filter are different from initial coefficients of the second feed-forward filter and the fourth feed-forward filter.

In accordance with any embodiments of the present disclosure, the communication system further comprises a 2D noise whitening and maximum likelihood (ML) detection module coupled to the modified DFE and configured to compensate the spatial noise correlation that exists between current set of determined symbols of the equalized X-Pol signal and equalized Y-Pol signal.

In accordance with any embodiments of the present disclosure, the communication system further comprises a simplified maximum likelihood (SML) detection module coupled to the modified DFE and configured to compensate the spatial noise correlation that exists between current set of determined symbols of the equalized X-Pol signal and equalized Y-Pol signal.

In accordance with any embodiments of the present disclosure, the SML detection module comprises: a first SML path comprising: a first SML feed-forward filter configured to receive and filter the determined symbols in the equalized Y-Pol signal; a first soft and/or hard decision module configured to receive the determined symbols in the equalized Y-Pol signal and make a decision on the determined symbols in the equalized Y-Pol signal; a first SML feed-backward filter configured to filter the decision made on the determined symbols in the equalized Y-Pol signal; and a first SML adder configured to add the determined symbols in the equalized X-Pol signal received from the modified DFE, add output from the first SML feed-forward filter and subtract output from the first SML feed-backward filter to determine the symbols in the equalized X-Pol signal.

In accordance with any embodiments of the present disclosure, the SML detection module comprises: a second SML path comprising: a second SML feed-forward filter configured to receive and filter the determined symbols in the equalized X-Pol signal; a second soft and/or hard decision module configured to receive the determined symbols in the equalized X-Pol signal and make a decision on the determined symbols in the equalized X-Pol signal; a second SML feed-backward filter configured to filter the decision made on the determined symbols in the equalized X-Pol signal; and a second SML adder configured to add the determined symbols in the equalized Y-Pol signal received from the modified DFE, add output from the second SML feed-forward filter and subtract output from the second SML feed-backward filter to determine the symbols in the equalized Y-Pol signal.

In accordance with any embodiments of the present disclosure, the communication system is at least one of a wireless communication system and an optical communication system.

In accordance with a second broad aspect of the present disclosure, there is provided a communication method comprising: filtering, by a first feed-forward filter, a current set of symbols in an equalized X-Pol signal; filtering, by a second feed-forward filter, a current set of symbols in an equalized Y-Pol signal; filtering, by a first feed-backward filter, a previously decided set of symbols associated with the equalized X-Pol signal; filtering, by a second feed-backward filter a previously decided set of symbols associated with the equalized Y-Pol signal; adding, by a first adder, the outputs from the first feed-forward filter and the second feed-forward filter; and subtracting, by the first adder, the outputs from the first feed-backward filter and the second feed-backward filter from the addition of outputs from the first feed-forward filter and the second feed-forward filter to determine the symbols in the equalized X-Pol signal.

In accordance with any embodiments of the present disclosure, the communication method further comprises: filtering, by a third feed-forward filter, the current set of symbols in the equalized Y-Pol signal; filtering, by a fourth feed-forward filter, the current set of symbols in an equalized X-Pol signal; filtering, by a third feed-backward filter, the previously decided set of symbols associated with the equalized Y-Pol signal; filtering, by a fourth feed-backward filter configured to filter the previously decided set of symbols associated with the equalized X-Pol signal; adding, by a second adder, outputs from the third feed-forward filter and the fourth feed-forward filter; and subtracting, by the second adder, outputs from the third feed-backward filter and the fourth feed-backward filter from a sum of the outputs from the third feed-forward filter and the fourth feed-forward filter to determine the symbols in the equalized Y-Pol signal.

In accordance with any embodiments of the present disclosure, the first feed-forward filter and the third feed-forward filter are initialized with same filter coefficients.

In accordance with any embodiments of the present disclosure, the second feed-forward filter and the fourth feed-forward filter are initialized with same filter coefficients.

In accordance with any embodiments of the present disclosure, initial filter coefficients of the first feed-forward filter and the third feed-forward filter are different from initial coefficients of the second feed-forward filter and the fourth feed-forward filter.

In accordance with any embodiments of the present disclosure, the communication method further comprises: compensating, by a 2D noise whitening and maximum likelihood (ML) detection module coupled to the modified DFE, the spatial noise correlation that exists between current set of determined symbols of the equalized X-Pol signal and equalized Y-Pol signal.

In accordance with any embodiments of the present disclosure, the communication method further comprises: compensating, by a simplified maximum likelihood (SML) detection module coupled to the modified DFE, the spatial noise correlation that exists between current set of determined symbols of the equalized X-Pol signal and equalized Y-Pol signal.

In accordance with any embodiments of the present disclosure, the communication method further comprises: receiving and filtering, by a first SML feed-forward filter, the determined symbols in the equalized Y-Pol signal; receiving, by a first soft and/or hard decision module, the determined symbols in the equalized Y-Pol signal; making a decision, by the first soft and/or hard decision module, on the determined symbols in the equalized Y-Pol signal; filtering, by a first SML feed-backward filter, the decision made on the determined symbols in the equalized Y-Pol signal; adding, by a first SML adder, the determined symbols in the equalized X-Pol signal received from the modified DFE, and output from the first SML feed-forward filter; and subtracting, by the first SML adder, output from the first SML feed-backward filter from a sum of the determined symbols in the equalized X-Pol signal, and output from the first SML feed-forward filter to determine the symbols in the equalized X-Pol signal.

In accordance with any embodiments of the present disclosure, the communication method further comprises: receiving and filtering, by a second SML feed-forward filter, the determined symbols in the equalized X-Pol signal; receiving, by a second soft and/or hard decision module, the determined symbols in the equalized X-Pol signal; making a decision, by the second soft and/or hard decision module, on the determined symbols in the equalized X-Pol signal; filtering, by a second SML feed-backward filter, the decision made on the determined symbols in the equalized X-Pol signal; adding, by a second SML adder, the determined symbols in the equalized Y-Pol signal received from the modified DFE and output from the second SML feed-forward filter; and subtracting, by the second SML adder, output from the second SML feed-backward filter from a sum of the determined symbols in the equalized Y-Pol signal and output from the second SML feed-forward filter to determine the symbols in the equalized Y-Pol signal.

In accordance with any embodiments of the present disclosure, the communication method is at least one of a wireless communication method and an optical communication method.

BRIEF DESCRIPTION OF THE FIGURES

Further features and advantages of the present disclosure will become apparent from the following detailed description, taken in combination with the appended drawings, in which:

FIG. 8 illustrates a flowchart of a process implemented over the communication network for compensating the polarization dependent loss (PDL) in communication networks.

Figure 1:
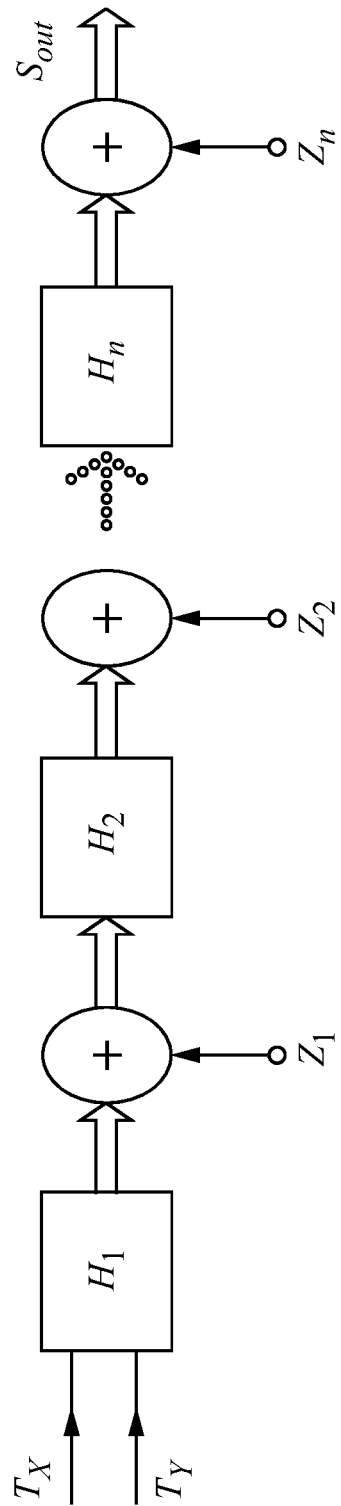
FIG. 1 (Prior Art) illustrates a block diagram of a network model corresponding to an optical network.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes systems and methods for compensating the polarization dependent loss (PDL) in dual polarized communication networks in an efficient manner.

Unless otherwise defined or indicated by context, all technical and scientific terms used herein have the same meaning as commonly understood by one of ordinary skill in the art to which the described embodiments appertain.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof Implementations of the present technology each have at least one of the above- mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes systems and methods for reducing the PDL in dual polarized communication networks in an efficient manner.

FIG. 1 (Prior Art) illustrates a block diagram of a network model corresponding to an optical network 100. The optical network 100 may have n spans including optical fibers and optical components such as optical amplifiers, wavelength switching switches (WSSs), add/drop switches or the like. The optical fibers and WSSs and other similar components contributing to polarization dependent loss (PDL) may be modeled in the matrix $H_i$ and the Erbium-Doped Fiber amplifier (EDFA) may be modelled by an additive white Gaussian complex noise $Z_i \sim CN(0,1)$ with unit variance per polarization signal.

In order to analyze the effect of PDL, generally, a MIMO system model is used, in which PDL is represented by a multiplicative slowly varying impairment H, which is unknown at the transmitter.

A basic PDL contributing component may be modeled as:

$$H_{PDL} = U \sum V = U \begin{bmatrix} \sqrt{1-\gamma} & 0 \\ 0 & \sqrt{1+\gamma} \end{bmatrix} V \quad (1)$$

Where U and V are random rotation (unitary) matrices representing the orientation mismatch between polarization states and the axes of the PDL contributing component. Accordingly, the PDL may be defined by:

$$\Gamma_{dB} = 10\log_{10}\frac{1-\gamma}{1+\gamma} \quad (2)$$

The resulting output signal $S_{out}$ may be given by:

$$S_{out} = \prod_{(i=1)}^{n} H_i \begin{bmatrix} T_X \\ T_Y \end{bmatrix} + \sum_{(i=1)}^{n}\left(\prod_{(j=i+1)}^{n} H_j Z_i\right) = HS_{in} + Z \quad (3)$$

Where $S_{out}$ is the signal output of the optical network 100, $$S_{in} = \begin{bmatrix} T_X \\ T_Y \end{bmatrix}$$

is the input signal to the optical network in which $T_x$ represents the X-pol signal and $T_y$ represents the Y-pol signal and Z is colored noise. Accordingly, a link with distributed PDL contributing components, behaves as a single-element PDL channel with an equivalent $\Gamma_{dB}$ aggregating the ones of the elementary PDL-impaired components, along with a correlated noise Z.

In order to simplify the analysis, without compromising the performance, conventionally, a Lumped PDL model is implemented. The only difference between distributed model and lumped model is the nature of additive noise. In a lumped model, a given optical link consists of a single PDL contributing component, along with white noise Z instead of colored noise.

Assuming a lumped channel model, the frequency domain representation of the received signal may be written as:

$$\begin{bmatrix} R_X(f) \\ R_Y(f) \end{bmatrix} = \quad (4)$$

$$H_{linear}(f)H_{PDL}(f)\begin{bmatrix} T_X(f) \\ T_Y(f) \end{bmatrix} + \begin{bmatrix} N_X(f) \\ N_Y(f) \end{bmatrix} = H(f)\begin{bmatrix} T_X(f) \\ T_Y(f) \end{bmatrix} + \begin{bmatrix} N_X(f) \\ N_Y(f) \end{bmatrix}$$

Where $H(f)=H_{linear}(f)H_{PDL}(f)$ is the equivalent channel of the fiber, $T_X(f)$ is the frequency domain representation of the transmitted X-pol signal, $T_Y(f)$ is the frequency domain representation of the transmitted Y-pol signal , $N_X(f)$ is the frequency domain representation of the AWGN on X-pol and $N_Y(f)$ is the frequency domain representation of the AWGN on Y-pol At the receiver end, in case of a zero-forcing (ZF) equalizer, we get the following equalized signal:

$$\begin{bmatrix} \hat{R}_X(f) \\ \hat{R}_Y(f) \end{bmatrix} = \quad (5)$$

$$H^{-1}(f)\begin{bmatrix} R_X(f) \\ R_Y(f) \end{bmatrix} = \begin{bmatrix} T_X(f) \\ T_Y(f) \end{bmatrix} + H^{-1}(f)\begin{bmatrix} N_X(f) \\ N_Y(f) \end{bmatrix} = \begin{bmatrix} T_X(f) \\ T_Y(f) \end{bmatrix} + \begin{bmatrix} \hat{N}_X(f) \\ \hat{N}_Y(f) \end{bmatrix}$$

Where $$\begin{bmatrix} \hat{N}_X(f) \\ \hat{N}_Y(f) \end{bmatrix} = H^{-1}(f) \begin{bmatrix} N_X(f) \\ N_Y(f) \end{bmatrix}.$$

Unless H is a unitary matrix, $\hat{N}_Y(f)$ and $\hat{N}_Y(f)$ may be spatially (polarization) correlated with $\sigma_{\hat{N}_X}^2 + \sigma_{\hat{N}_Y}^2 > \sigma_{N_X}^2 + \sigma_{N_Y}^2$.

However, in practical optical systems, the channel is unknown at the receiver side and an adaptive equalizer is used to track the channel. For example, a least mean square (LMS) equalizer may be used as a channel equalizer, which converges to ZF solution at high SNR only. Accordingly, at typical SNR values, the equalized signal may be represented as:

$$\begin{bmatrix} \hat{R}_X(f) \\ \hat{R}_Y(f) \end{bmatrix} = W(f) \begin{bmatrix} R_X(f) \\ R_Y(f) \end{bmatrix} = W(f)H(f) \begin{bmatrix} T_X(f) \\ T_Y(f) \end{bmatrix} + W(f) \begin{bmatrix} N_X(f) \\ N_Y(f) \end{bmatrix} \quad (6)$$

Thus, the equalized signal after LMS exhibits temporally spatial (polarization) correlation:

i. In absence of PDL, H is a unitary matrix and this correlation may be very small, almost no impact on performance.

ii. However, as PDL increases, H is no longer a unitary matrix and correlation increases leading to performance loss.

The above situation is similar to the filtering effect of WSS on optical signals, however without polarization correlation. The LMS equalizer may result in equalized signal with temporally correlated noise which degrades the system performance. In order to improve the performance, generally, a post equalization stage consisting of a noise whitening filter followed by a non-linear equalizer as Bahl, Cocke, Jelinek and Raviv (BCJR) decoder or maximum likelihood sequence estimator (MLSE) is included at the receiver side.

Also as previously discussed, the presence of PDL in the optical network 100 leads to the power imbalance between the X-pol signal and Y-pol signal and the system performance is determined by the polarization of lower quality of X-pol signal and Y-pol signal. Also, the performance of the optical network 100 is dependent on the angle of incidence State-of-Polarization (SOP). Accordingly, several conventional PDL mitigation techniques have been proposed in the art to improve the system performance in presence of PDL.

In general, the conventional PDL mitigation techniques may be classified into two main categories: i) transmitter PDL precoding, and ii) receiver post processing. In the first PDL mitigation category, signal precoding is applied using the same principles of space-time coding used in wireless communications. Examples of space-time codes are the silver code, golden code and some codes based on number theory. All of these space-time precoding techniques require reverse decoding at the receiver side in order to decode the precoded symbols. In the second PDL mitigation category, receiver post-processing techniques are employed. The techniques proposed in this category aim to whiten the space-time correlated noise generated as a result of adaptive equalization in the presence of PDL.

The performance gains from the noted conventional techniques are not significant and PDL still represents a limiting issue for long-haul optical system transmission. Transmitter PDL precoding schemes cannot improve the system performance at all incident state-of-polarization angles. Also, at the receiver side after adaptive equalization, the noise exhibits temporal and spatial (polarization) correlation that degrades the system performance in terms of SNR and BER. Moreover, colored noise affects the performance of forward-error-correction (FEC) decoding, leading to Pre-FEC BER degradation.

Moreover, receiver post-processing techniques can whiten the correlated noise, however, with limited ability and huge implementation complexity. The conventional techniques neglect the practical assumption of simultaneous time and spatial correlation in the noise samples. Moreover, the conventional techniques cannot handle noise correlation beyond one symbol duration. Finally, the complexity of these schemes is exponential in the constellation size, which makes them impractical for higher order modulation schemes. It is to be noted that post-equalization techniques designed for WSS noise whitening deal only with time-correlated noise and cannot handle spatially correlated noise.

With this said, there is an interest in developing systems and methods for reducing the PDL in dual polarized communication networks in an efficient manner.

Various non-limiting embodiments are directed towards post-equalization techniques that may whiten the correlated noise in time and space (polarization). Various non-limiting embodiments, including post equalization techniques for PDL, may handle noise correlation for time and space and may replace the post equalization for WSS noise whitening.

Figure 2:
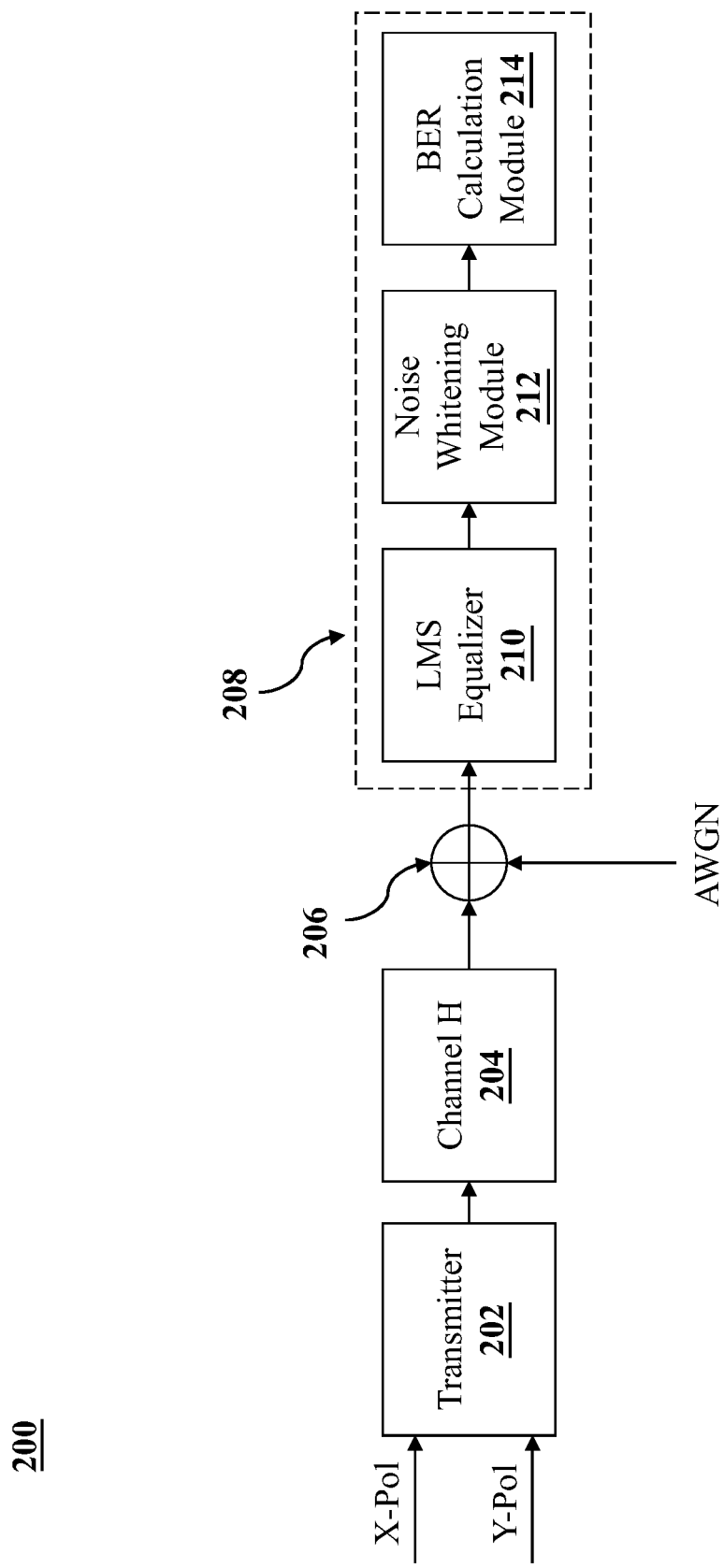
FIG. 2 illustrates an optical communication network including a whitening module configured to reduce the PDL in the optical communication network in an efficient manner.

FIG. 2 illustrates an optical communication network 200 including a noise whitening module 212 configured to reduce the PDL in the optical communication network 200 in an efficient manner. As shown, the optical communication network 200 may include a transmitter 202 and a receiver 208. Among other components, the receiver 208 may include a least mean square (LMS) equalizer 210, the noise whitening module 212 and a BER calculation module 214.

The transmitter 202 may be configured to receive X polarized (X-Pol) and Y polarized (Y-Pol) signals to be transmitted over the communication network 200. The transmitter 202 may precode the X-Pol and Y-Pol signals in accordance with any suitable space-time codes for example the silver code, golden code, modified Walsh Hadamard transform (MWHT) or the like. In various non-limiting embodiments, MWHT precoding technique may be considered as a representative precoding technique. However, any suitable precoding technique may be implemented by the transmitter 202 without limiting the scope of present disclosure.

The encoding matrix corresponding to the MWHT precoding technique may be described as:

$$\begin{bmatrix} X'(\omega) \\ Y'(\omega) \end{bmatrix} = M \begin{bmatrix} X(\omega) \\ Y(\omega) \end{bmatrix} \quad (7)$$

Where M=AB, $$A = \begin{bmatrix} \exp\left(\frac{j\omega T_d}{2}\right) & 0 \\ 0 & \exp\left(-\frac{j\omega T_d}{2}\right) \end{bmatrix}$$

and $$B = \frac{1}{\sqrt{2}}\begin{bmatrix} 1 & 1 \\ 1 & -1 \end{bmatrix},$$

X(ω) and Y(ω) are the frequency domain representation of the X-Pol and Y-Pol signals respectively and $T_d$ is a symbol duration. Initially, the transmitter 202 may multiplex the X-Pol and Y-Pol signals in space by the matrix B, which is Walsh Hadamard matrix, and then the transmitter 202 may apply a time-delay or temporal offset by using the matrix A.

The transmitter 202 may transmit the precoded X-Pol and Y-Pol signals over the channel H 204. The channel H 204 may include various optical components, such as EDFAs and WSSs, which may give different gains to X-pol signal and Y-pol signal. Hence there exists a power imbalance between the two polarization signals. Additionally, additive white Gaussian noise (AWGN) may be added to the precoded X-Pol and Y-Pol signals.

At the receiver 208, the LMS equalizer 210 may perform equalization over the received X-Pol and Y-Pol signals. It to be noted that the LMS equalization may result in correlated colored noise in time and space of the received X-Pol and Y-Pol signals. To reduce the effect of colored noise, the X-Pol and Y-Pol signals are forwarded to the noise whitening module 212.

Figure 3:
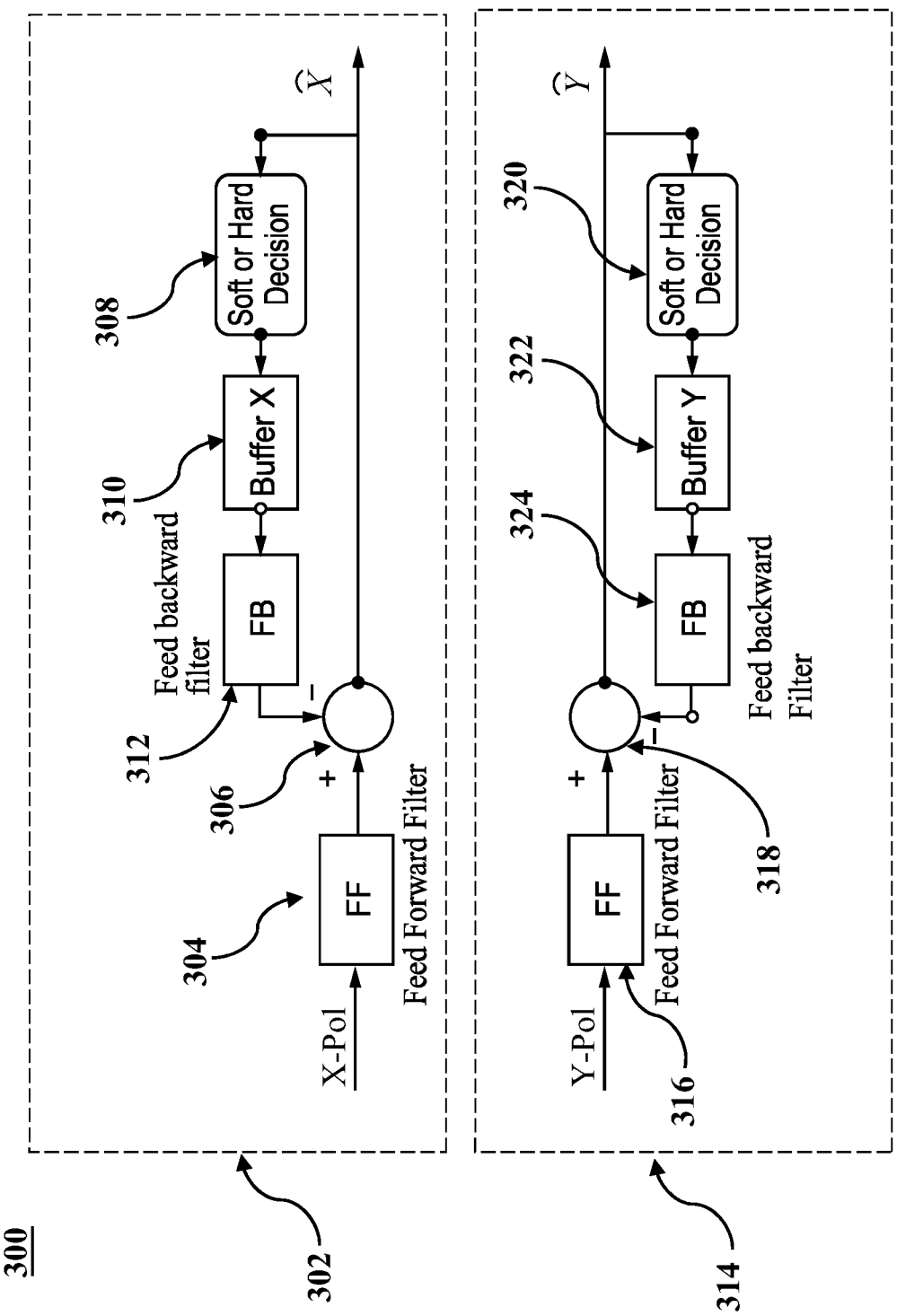
FIG. 3 (Prior Art) illustrates a block diagram of a conventional decision feedback equalizer (DFE)

Conventionally, a decision feedback equalizer (DFE) can be used to whitening the colored noise. FIG. 3 (Prior Art) illustrates a block diagram of a conventional DFE 300. As shown, the conventional DFE 300 includes a first path 302 to process the X-Pol signal and a second path 314 to process the Y-Pol signal.

The first path 302 includes a feed-forward filter 304, an adder 306, a soft and/or hard decision module 308, a buffer 310 and a feed-backward filter 312. The feed-forward filter 304 receives equalized X-Pol signal from the LMS equalizer 210 and filters the equalized X-Pol signal. The filtered X-Pol signal is fed to the soft and/or hard decision module 308 to make a decision on symbols in the filtered X-Pol. The output of the soft and/or hard decision module 308 is stored in the buffer 310. The previously decided symbols stored in the buffer 310 are filtered using the feed-backward filter 312. The output of the feed-backward filter 312 is subtracted from the output of the feed-forward filter 304 using the adder 306 to determine the symbols in the X-Pol signal.

In a similar manner, the second path 314 implements a feed-forward filter 316, an adder 318, a soft and/or hard decision module 320, a buffer 322 and a feed-backward filter 324. The feed-forward filter 316 receives equalized Y-Pol signal from the LMS equalizer 210 and filters the equalized Y-Pol signal. The filtered Y-Pol signal is fed to the soft and/or hard decision module 320 to make a decision on symbols in the filtered Y-Pol. The output of the soft and/or hard decision module 320 is stored in the buffer 322. The previously decided symbols stored in the buffer 324 are filtered using the feed-backward filter 324. The output of the feed-backward filter 324 is subtracted from the output of the feed-forward filter 316 using the adder 318 to determine the symbols in the Y-Pol signal.

It is to be noted that in the conventional DFE 300 the X-Pol and the Y-Pol signals are processed independently. One of the drawbacks of the conventional DFE 300 is error propagation. Error propagation can happen when one symbol is decoded incorrectly and affects the decision of the following symbols. The LMS adaptive equalization performed by the LMS equalizer 210 results in correlated noise in time and space (polarization). To this end, there is an interest in modifying the structure of DFE 300 or the bidirectional DFE (as discussed below) in order to handle the temporally-spatially correlated noise.

Figure 4:
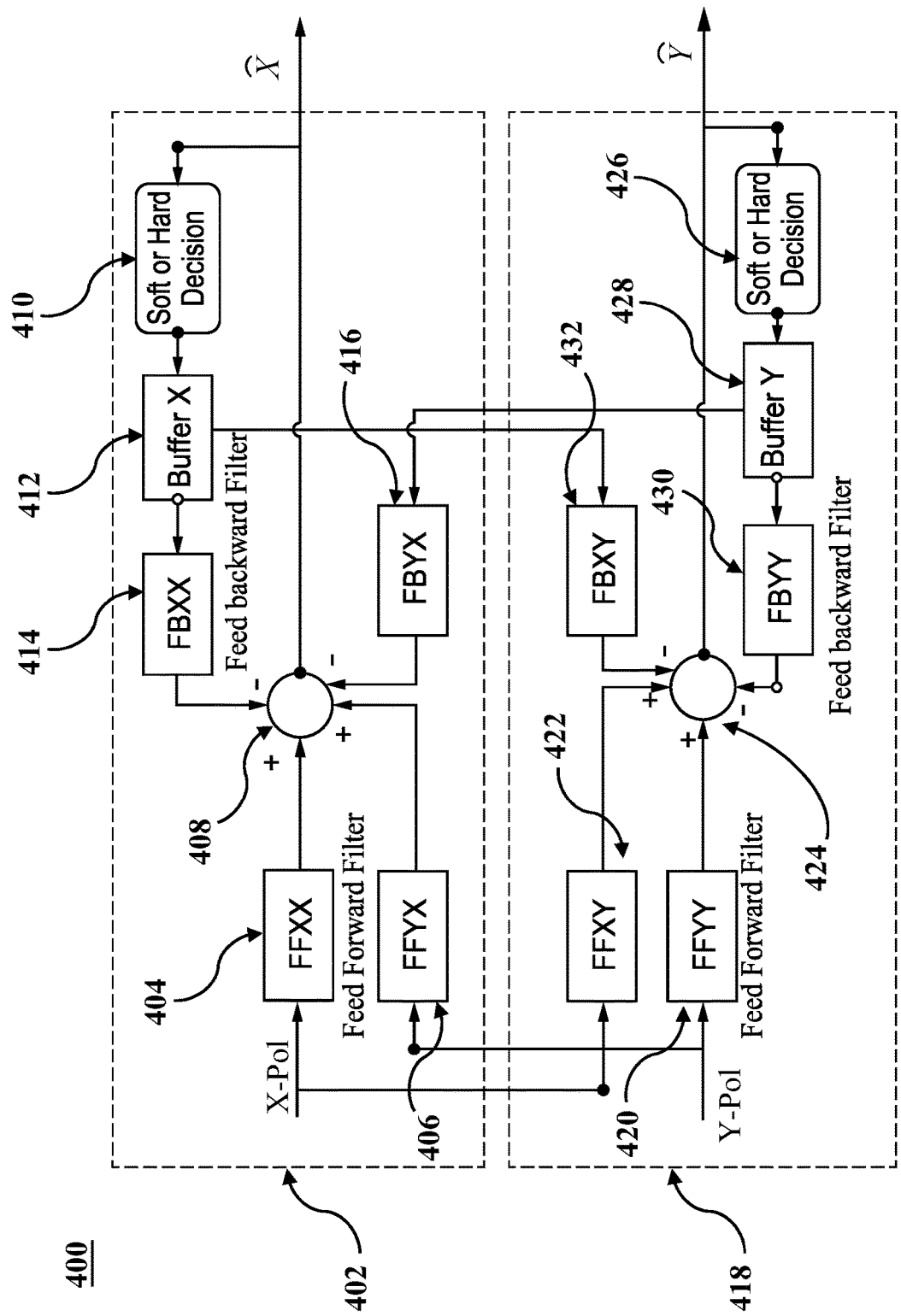
FIG. 4 illustrates a block diagram of a modified DFE, in accordance with various non-limiting embodiments of the present disclosure.

FIG. 4 illustrates a block diagram of a modified DFE 400 in accordance with various non-limiting embodiments of the present disclosure. As shown, the modified DFE 400 may include a first modified path 402 to process the X-Pol signal and a second modified path 418 to process the Y-Pol signal.

The first modified path 402 may include a first feed-forward filter FFXX 404, a second feed-forward filter FFYX 406, an adder 408, a soft and/or hard decision module 410, a buffer 412, a first feed-backward filter FBXX 414 and a second feed-backward filter FBYX 416. In a similar manner, the second path 418 may include a third feed-forward filter FFYY 420, a fourth feed-forward filter FFXY 422, an adder 424, a soft and/or hard decision module 426, a buffer 428, a third feed-backward filter FBYY 430 and a fourth feed-backward filter FBXY 432.

For initial processing of the equalized X-Pol signal, in the first path 402, the FFXX 404 may receive the equalized X-Pol signal from the LMS equalizer 210 and may filter a set of symbols in the equalized X-Pol signal. The FFYX 406 may receive the equalized Y-Pol signal from the LMS equalizer 210 and may filter a set of symbols in the equalized Y-Pol signal. The filtered set of symbols in the equalized X-Pol signal and the filtered set of symbols in the Y-Pol signal from the FFXX 404 and the FFYX 406 respectively may be added by the adder 408 and the added symbols may be fed to the soft and/or hard decision module 410. The soft and/or hard decision module 410 may make a decision on the set of filtered set symbols in the equalized X-Pol signal. The output of the soft and/or hard decision module 410 may be stored in the buffer 412 in the form of respective decided symbols.

Similarly, for initial processing of the equalized Y-Pol signal, in the second path 418, the FFYY 420 may receive the equalized Y-Pol signal from the LMS equalizer 210 and may filter a set of symbols in the equalized Y-Pol signal. The FFXY 422 may receive the equalized X-Pol signal from the LMS equalizer 210 and may filter a set of symbols in the equalized X-Pol signal. The filtered set of symbols in the equalized Y-Pol signal and the filtered set of symbols in the X-Pol signal from the FFYY 420 and the FFXY 422 respectively may be added by the adder 424 and the added symbols may be fed to the soft and/or hard decision module 426. The soft and/or hard decision module 426 may make a decision on the set of filtered set symbols in the equalized Y-Pol signal. The output of the soft and/or hard decision module 426 may be stored in the buffer 428 in the form of respective decided symbols.

For processing of the next set of symbols in the X-Pol, in addition to the techniques discussed above, in the first path 402 the FBXX 414 may filter the previously decided symbols associated with the equalized X-Pol signal stored in the buffer 412. Also, the FBYX 416 may filter the previously decided symbols associated with the equalized Y-Pol signal stored in the buffer 428. The outputs from the FBXX 414 and the FBYX 416 may be subtracted from the outputs of the FFXX 404 and the FFYX 406 by the adder 408 to determine the symbols in the X-Pol signal.

In a similar manner, for processing of the next set of symbols in the Y-Pol, in addition the techniques discussed above, in the second path 418 the FBYY 430 may filter the previously decided symbols associated with the equalized Y-Pol signal stored in the buffer 428. Also, the FBXY 432 may filter the previously decided symbols associated with the equalized X-Pol signal stored in the buffer 412. The outputs from the FBYY 430 and the FBXY 432 may be subtracted from the outputs of the FFYY 420 and the FFXY 422 by the adder 424 to determine the symbols in the Y-Pol signal.

In certain non-limiting embodiments, a number of taps of the FFXX 404, FFYX 406, FFYY 420, and FFXY 422 may be set to any value. One example is to set the number of taps to 3. Accordingly, these filters may be initialized as follows:

FFXX 404=FFYY 420=[1,0,0]

FFYX 406=FFXY 422=[0,0,0]

In certain non-limiting embodiments, a number of taps of FBXX 414, FBYX 416, FBYY 430 and FBXY 432 may be one less than the number of taps of the FFXX 404, FFYX 406, FFYY 420, and FFXY 422. One example is to set the number of taps to 2. Accordingly, these filters may be initialized as follows:

FBXX 414=FBXY 416=FBYX 430=FBYY 432=[0, 0]

Once the taps of the feed-forwards filters and feed-backward filters have been initialized, the output of the modified DFE 400 may be described as:

$$\hat{X}[n] = \sum_{k=0}^{L_F-1} FFXX[k]X[n-k] - \sum_{k=0}^{L_B-1} FBXX[k]\bar{X}[n-k-d_0] + \sum_{k=0}^{L_F-1} FFYX[k]Y[n-k] - \sum_{k=0}^{L_B-1} FBYX[k]\bar{Y}[n-k-d_0]$$ (8)

$$\hat{Y}[n] = \sum_{k=0}^{L_F-1} FFYY[k]Y[n-k] - \sum_{k=0}^{L_B-1} FBYY[k]\bar{Y}[n-k-d_0] + \sum_{k=0}^{L_F-1} FFXY[k]X[n-k] - \sum_{k=0}^{L_B-1} FBXY[k]\bar{X}[n-k-d_0]$$ (9)

Where $L_F$ may the number of taps of the FFXX 404, FFYX 406, FFYY 420, and FFXY 422 ($L_F=3$ in the previous initialization), $L_B$ may be the number of taps of FBXX 414, FBY X 416, FBYY 430 and FBXY 432 ($L_B=2$ in the previous initialization), X[n] may be the input signal of X-Pol at time n, Y[n] may be the input signal of Y-Pol at time n, $\bar{X}$[n] may be the decided symbols of X-Pol at time n, $\bar{Y}$[n] is the decided symbols of Y-Pol at time n, $d_0$ may be the delay in symbol decision and may be set to 1, $\hat{X}$[n] may be the output of the modified DFE 400 corresponding to the X-Pol at time n and $\hat{Y}$[n] may be the output of the modified DFE 400 corresponding to the Y-Pol at time n.

It is to be noted that all the filters may be updated by LMS update equation. For example:

FFXX=FFXX+μ $err_x X^+$ (10)

Where μ may be the step size, $err_x = \bar{X}[n] - X[n]$ and X* may be the conjugate of the input vector X=[X[n], X[n−1], ..., X[n−$L_F$+1]]. In certain non-limiting embodiments, $\bar{X}$[n] may be a soft and/or hard decision symbol of $\hat{X}$[n].

The modified DFE 400 may utilize the hard/soft estimation of previous symbols to improve the estimation of the current symbol of the X-Pol and Y-Pol signals. Furthermore, a bidirectional modified DFE may be utilized to improve the performance. In other words, to further improve the performance of the DFE 400, a bidirectional DFE may use at least two DFE equalizers. The first DFE equalizer may operate on the received X-Pol signal and Y-Pol signal, generated at the output of LMS equalizer directly. The second DFE equalizer may operate on a time-reversed version of the received X-Pol signal and Y-Pol signal. The output of the second DFE may be time-reversed, then averaged with the output of the first DFE.

Figure 5:
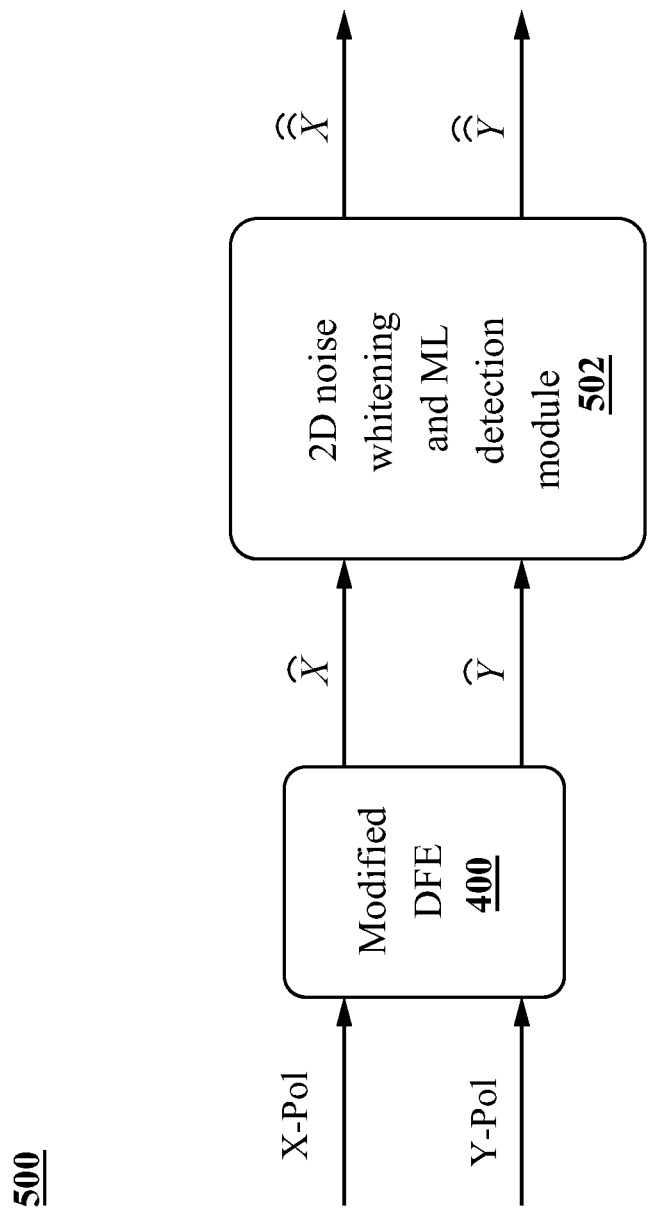
FIG. 5 illustrates a block diagram of the modified DFE followed by a 2D noise whitening and maximum likelihood (ML) detection module, in accordance with various non-limiting embodiments of the present disclosure.

In case there is noise spatial correlation between current symbols of X-pol and Y-pol, the modified DFE 400 may be followed by a 2D noise whitening and maximum likelihood (ML) detection module 502 to compensate the noise spatial correlation as illustrated in FIG. 5.

As shown in FIG. 5, the modified DFE 400 may be a first stage of the noise whitening module 212 followed by a second stage of the noise whitening module 212 including the 2D noise whitening and ML detection module 502. The first stage may compensate the spatial-temporal colored noise and the second stage may compensate the spatial correlation of noise at the current instant of time.

As discussed previously, the modified DFE 400 may receive the X-Pol and Y-Pol signals and may generate the corresponding $\hat{X}$ and $\hat{Y}$ signals. The modified DFE 400 may provide the $\hat{X}$ and $\hat{Y}$ signals to the 2D noise whitening and ML detection module 502.

The 2D noise whitening and ML detection module 502 may perform whitening of the spatially correlated noise in the $\hat{X}$ and $\hat{Y}$ signals. To do so, the 2D noise whitening and ML detection module 502 may compute a 2D noise covariance matrix.

In order to design the whitening stage, first, we need to compute the 2D noise covariance matrix. This can be simply done as follows:

$\eta_x = HD(\hat{X}) - \hat{X}$ (11)

$\eta_y = HD(\hat{Y}) - \hat{Y}$ (12)

Where $\eta_x$ is the noise estimate in $\hat{X}$ signal, is the noise estimate in $\hat{Y}$ signal, HD(.) may be hard decisions corresponding to the $\hat{X}$ and $\hat{Y}$ signals. The 2D noise whitening and ML detection module 502 may compute the 2D noise covariance matrix as:

$$Q = E\{NN^H\}, N[n] = \begin{bmatrix} \eta_x[n] \\ \eta_y[n] \end{bmatrix}$$ (13)

Where N[n] is the estimated noise vector at time instant n, E{} is the expectation operator and Q is the estimated covariance matrix. Once we computed Q, the whitening matrix C can be computed as $C = \sqrt{Q}^{-1}$ (14)

Where $\sqrt{Q}$ is the matrix square root of Q. For a given constellation of $2^l$ points, for example, l=2 in QPSK and l=4 in 16QAM, the 2D noise whitening and ML detection module 502 may define $$S_{2D} = \begin{bmatrix} S_X^m \\ S_Y^p \end{bmatrix} \forall\, m,$$

p=0,1, ..., $2^l$−1 as all the possible combinations of transmitted symbols and $$R_{2D} = \begin{bmatrix} \hat{X}[n] \\ \hat{Y}[n] \end{bmatrix}$$

as the equalized symbols at the output of the modified DFE 400 at time instant n. Finally, the 2D noise whitening and ML detection module 502 may apply the 2D noise whitening and joint ML detection as:

$$\min_{\{m,p\}} \|CR_{2D} - CS_{2D}\| \tag{15}$$

The 2D noise whitening and ML detection module 502 may select $S_{2D}$ that may reduce the norm.

It is to be noted that even though the 2D noise whitening and ML detection module 502 may be capable of compensating the spatial noise correlation that may exist between current symbols of the X-Pol and Y-Pol, the complexity of the 2D noise whitening and ML detection module 502 may be exponential in the constellation cardinality.

Figure 6:
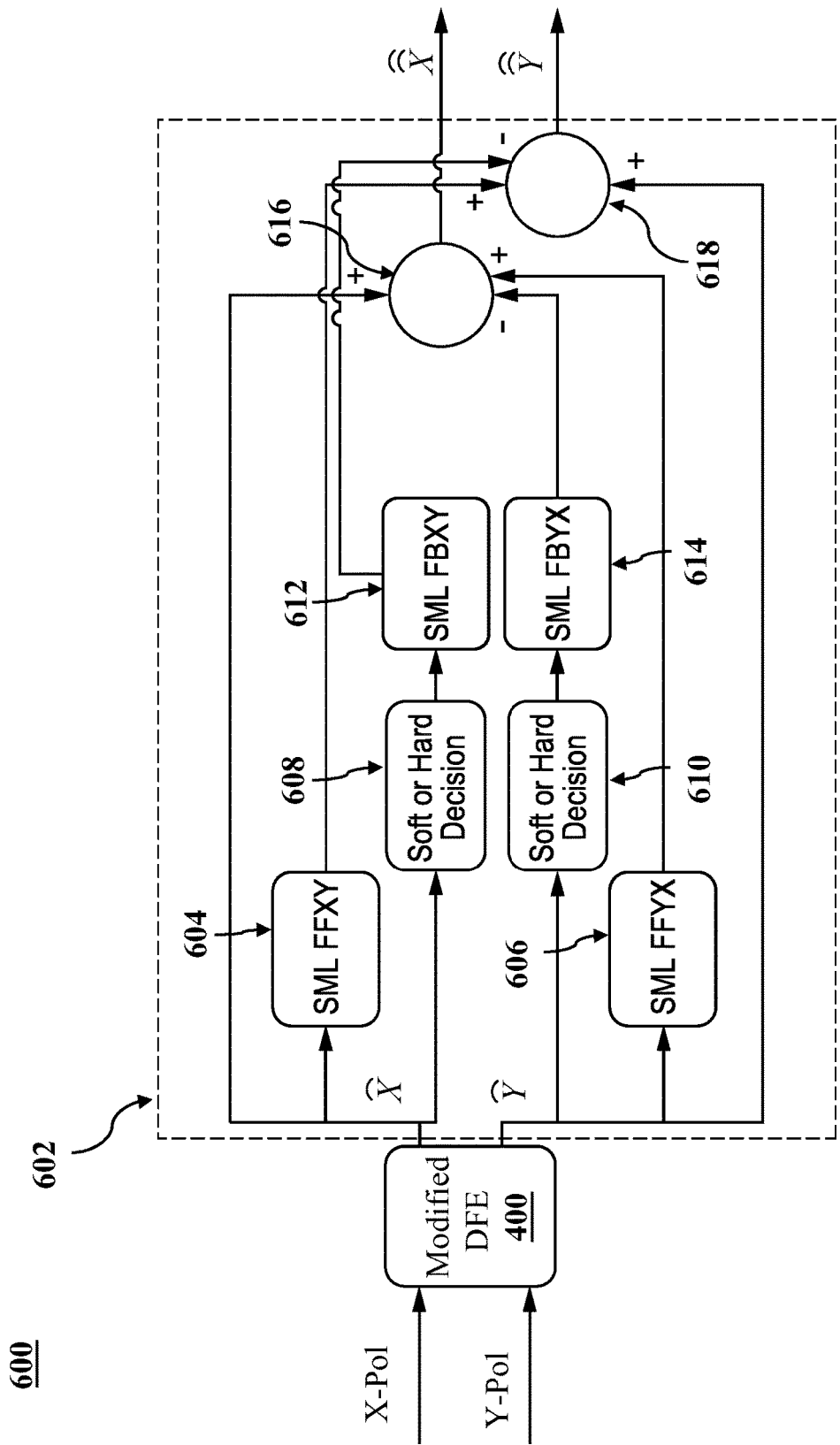
FIG. 6 illustrates a block diagram of the modified DFE followed by a simplified ML detection (SML) module, in accordance with various non-limiting embodiments of the present disclosure.

To this end, in accordance with various non-limiting embodiments of the present disclosure, a simplified ML (SML) has been developed. FIG. 6 illustrates a block diagram of the modified DFE 400 followed by a SML detection module 602, in accordance with various non-limiting embodiments of the present disclosure. As shown in FIG. 6, the modified DFE 400 may be a first stage of the noise whitening module 212 followed by a second stage of the noise whitening module 212 including the SML detection module 602. The first stage may compensate the spatial-temporal colored noise and the second stage may compensate the spatial correlation of noise at the current instant of time.

The SML detection module 602 may whiten the spatial noise correlation in the current symbols of the X-Pol and Y-Pol with significant reduction in complexity without compromising the performance. The SML detection module 602 may rely on a simple filter structure to compensate the spatial noise correlation.

In certain non-limiting embodiments, the SML detection module 602 may include 4 single tap filters. The SML detection module 602 may include a first SML feed-forward filter $FFXY_{SML}$ 604, a second SML feed-forward filter $FFYX_{SML}$ 606, a first soft and/or hard decision module 608, a second soft and/or hard decision module 610, a first SML feed-backward filter $FBXY_{SML}$ 612, a second SML feed-backward $FBYX_{SML}$ 614, a first SML adder 616, and a second SML adder 618. It is to be noted that the SML detection module 602 may include other components, however, for the purpose of simplicity such components have been omitted from FIG. 6 for the purpose of simplicity.

In certain non-limiting embodiments, $FFXY_{SML}$ 604 and the first soft and/or hard decision module 608 may receive the $\hat{X}$ signal. Also, $FFYX_{SML}$ 606 and second soft and/or hard decision module 610 may receive $\hat{Y}$ signal. The first soft and/or hard decision module 608, and the second soft and/or hard decision module 610 may make a decision on symbols in the $\hat{X}$ signal and $\hat{Y}$ signal respectively. The output of the first soft and/or hard decision module 608, and the second soft and/or hard decision module 610 may be provided to the $FBXY_{SML}$ 612, and to the $FBYX_{SML}$ 614 respectively.

The first SML adder 616 may receive the $\hat{X}$ signal, output of the $FFYX_{SML}$ 606 and output of the $FBYX_{SML}$ 614. The output of the first SML adder 616 may be given as:

$$\hat{\hat{X}} = \hat{X} + FFYX_{SML} \hat{Y} - FBYX_{SML} D(\hat{Y}) \tag{16}$$

The second SML adder 618 may receive the $\hat{Y}$ signal, output of the $FFXY_{SML}$ 604 and output of the $FBXY_{SML}$ 612. The output of the second SML adder 618 may be given as:

$$\hat{\hat{Y}} = \hat{Y} + FFXY_{SML} \hat{X} - FBXY_{SML} D(\hat{X}) \tag{17}$$

In the above equations (16) and (17), D(.) may be the hard and/or soft decisions corresponding to the $\hat{X}$ and $\hat{Y}$ signals.

Returning to FIG. 2, the output of the noise whitening module 212 may be provided to the BER calculation module 214 compute the performance of the optical communication network 200 in terms of BER.

The noise whitening module 212 including the modified DFE 400 and the SML detection module 602 provides several benefits. In particular, the noise whitening module 212 may assist in the whitening of the spatially (polarization)-temporal correlated noise without any degradation in Pre-FEC BER threshold, which has significant reduction in complexity as the complexity is linear in constellation cardinality. Further, the noise whitening module 212 may be used for WSS post equalization, implemented after adaptive equalization that may result in reduced overall BER. Also, the noise whitening module 212 may reduce the impact of PDL. Additionally, the noise whitening module 212 may be compatible with existing receiver designs and architectures, may provide power gains.

Figure 7:
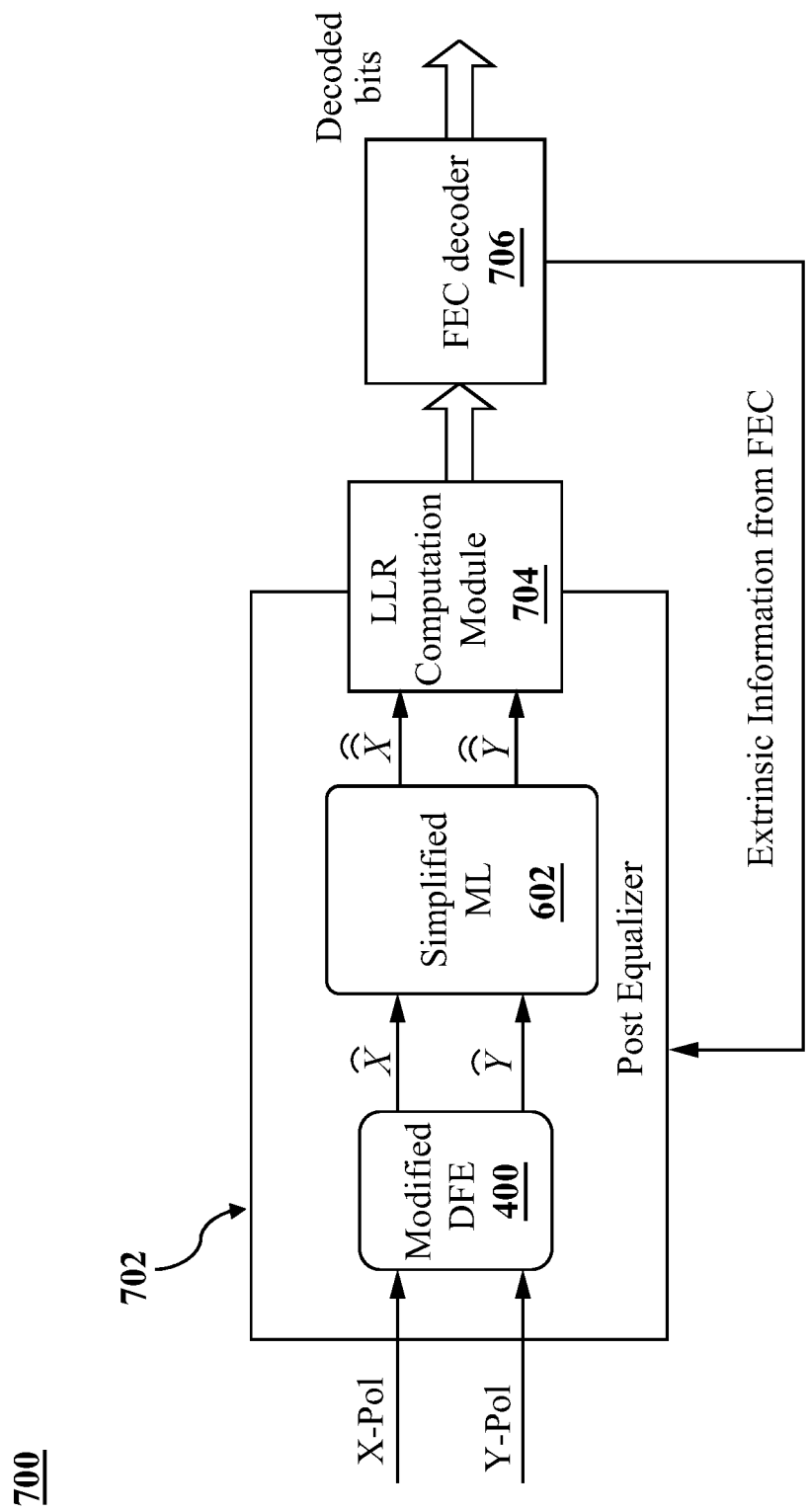
FIG. 7 illustrates a turbo equalization system incorporating the whitening module, in accordance with various non-limiting embodiments of the present disclosure.

In certain non-limiting embodiments, the noise whitening module 212 may assist in turbo equalization. FIG. 7 illustrates a turbo equalization system 700 incorporating the noise whitening module 212, in accordance with various non-limiting embodiments of the present disclosure. As shown, the turbo equalization system 700 may include a post equalizer 702 including the modified DFE 400, the SML detection module 602, log-likelihood ratios (LLRs) computation module 704 and a FEC decoder 706. The turbo equalization system 700 may include other components but such components have been omitted from FIG. 7 for the purpose of simplicity. During the first Turbo iteration, there may be no extrinsic information feedback from the FEC decoder 706 to the post equalizer 702 and the post equalizer 702 may generate the equalized symbols accordingly. After the first iteration, extrinsic information from the FEC decoder 706 may be fed back to the post equalizer 702 intrinsic information and signal equalization may be re-performed. The output from the post equalizer 702 may be used to compute the LLRs via the LLR computation module 704, which is fed to the FEC decoder 706 for internal FEC decoding. After a dedicated number of internal FEC iterations, FEC extrinsic information may be sent back again to the post equalizer 702 for a new Turbo iteration, or the process is terminated. It is to be noted that increasing the number of FEC iterations may provide better performance.

By way of example, in case of 16QAM constellation, the soft symbol generation may be done as follows: i) First, an LLR computation module, similar to the LLR computation module 704, may compute LLRs of a given symbol, ii) the turbo equalization system 700 may add the extrinsic information corresponding to the LLRs from the FEC decoder 706 to the calculated LLRs, and iii) the turbo equalization system 700 may compute the soft symbol based on the updated LLRs value. Accordingly, for a given symbol $\hat{X}$, approximate LLRs may be calculated by:

$$\lambda_{b_1} = \begin{cases} \hat{X}_d, & |\hat{X}_d| \le 2 \\ 2(\hat{X}_d - 1), & \hat{X}_d > 2 \\ 2(\hat{X}_d + 1), & \hat{X}_d < -2 \end{cases} \tag{18}$$

-continued $$\lambda_{b_2} = \frac{4(-|\hat{X}_d| + 2)}{\sigma^2} \quad (19)$$

Where, d denotes the real or imaginary component of estimated symbols $\hat{X}$. The LLRs using the FEC decoder 706 output may be represented as follows:

$$\bar{\lambda}_{b_1} = \frac{4}{\sigma^2}\lambda_{b_1} + \lambda e_1 \quad (20)$$

$$\bar{\lambda}_{b_2} = \lambda_{b_2} + \lambda e_2 \quad (21)$$

Where $\lambda e_i$ is the extrinsic information from the FEC decoder 706 corresponding to $\lambda_{b_i}$. Accordingly, the soft symbol estimate may be calculated by:

$$P = 1 - 0.5\left(1 + \tanh\left(\frac{\bar{\lambda}_{b1}}{2}\right)\right) \quad (22)$$

$$Q = \tanh\left(\frac{\bar{\lambda}_{b2}}{2}\right) \quad (23)$$

$$\bar{X}_d = (2P + 1)Q \quad (24)$$

By exploiting the extrinsic information from FEC decoder 706, and repeating the post-equalization process, the generated symbols from the post equalizer 702 may exhibit better quality compared to the initial values, calculated without FEC extrinsic information. The equalized symbols may be used to compute LLRs again, which may be sent to FEC decoding for a second round of FEC decoding. This process is repeated for a given number of global turbo iterations.

FIG. 8 illustrates a flowchart of a process 800 implemented over the communication network for reducing the PDL in communication networks. As shown, the process 800 commences at step 802 where a first feed-forward filter filters a current set of symbols in an equalized X-Pol signal. As previously noted, the FFXX 404 may receive the equalized X-Pol signal from the LMS equalizer 210 and may filter a set of symbols in the equalized X-Pol signal.

The process 800 advances to step 804 where a second feed-forwards filter filters a current set of symbols in an equalized Y-Pol signal. As noted above, the FFYX 406 may receive the equalized Y-Pol signal from the LMS equalizer 210 and may filter a set of symbols in the equalized Y-Pol signal.

The process 800 advances to step 806 where a first feed-backward filter filters a previously decided set of symbols associated with the equalized X-Pol signal. As discussed previously, the FBXX 414 may filter the previously decided symbols associated with the equalized X-Pol signal stored in the buffer 412.

The process 800 advances to step 808 where the second feed-backward filter filters a previously decided set of symbols associated with the equalized Y-Pol signal. As noted above, the FBYX 416 may filter the previously decided symbols associated with the equalized Y-Pol signal stored in the buffer 428.

The process 800 proceeds to step 810 where a first adder adds outputs from the first feed-forward filter and the second feed-forward filter. As shown, the filtered set of symbols in the equalized X-Pol signal and the filtered set of symbols in the Y-Pol signal from the FFXX 404 and the FFYX 406 respectively may be added by the adder 408 and the added symbols may be fed to the soft and/or hard decision module 410.

Finally, at step 812, the adder subtracts the outputs from the first feed-backward filter and the second feed-backward filter from the addition of outputs from the first feed-forward filter and the second feed-forward filter to determine the symbols in the equalized X-Pol signal. As noted previously, the outputs from the FBXX 414 and the FBYX 416 may be subtracted from the outputs of the FFXX 404 and the FFYX 406 by the adder 408 to determine the symbols in the X-Pol signal.

It is to be noted that the communication systems and methods are equally applicable to wireless communication systems (e.g., dual polarized microwave system) and optical communication systems.

It is to be understood that the operations and functionality of the noise whitening module 212, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A communication system comprising:
   a modified decision feedback equalizer (DFE), the modified DFE comprising a first path including:
      a first feed-forward filter configured to filter a current set of symbols in an equalized X-Pol signal;
      a second feed-forward filter configured to filter a current set of symbols in an equalized Y-Pol signal;
      a first feed-backward filter configured to filter a previously decided set of symbols associated with the equalized X-Pol signal;
      a second feed-backward filter configured to filter a previously decided set of symbols associated with the equalized Y-Pol signal; and
      a first adder configured to add outputs from the first feed-forward filter and the second feed-forward filter and subtract the outputs from the first feed-backward filter and the second feed-backward filter to determine the symbols in the equalized X-Pol signal.

2. The communication system of claim 1, wherein the modified DFE further comprises:
   a second path comprising:
      a third feed-forward filter configured to filter the current set of symbols in the equalized Y-Pol signal;
      a fourth feed-forward filter configured to filter the current set of symbols in the equalized X-Pol signal;
      a third feed-backward filter configured to filter the previously decided set of symbols associated with the equalized Y-Pol signal;

a fourth feed-backward filter configured to filter the previously decided set of symbols associated with the equalized X-Pol signal; and a second adder configured to add outputs from the third feed-forward filter and the fourth feed-forward filter and subtract outputs from the third feed-backward filter and the fourth feed-backward filter to determine the symbols in the equalized Y-Pol signal.

3. The communication system of claim 2, wherein the first feed-forward filter and the third feed-forward filter are initialized with same filter coefficients.

4. The communication system of claim 2, wherein the second feed-forward filter and the fourth feed-forward filter are initialized with same filter coefficients.

5. The communication system of claim 2, wherein initial filter coefficients of the first feed-forward filter and the third feed-forward filter are different from initial coefficients of the second feed-forward filter and the fourth feed-forward filter.

6. The communication system of claim 2 further comprising a two-dimensional (2D) noise whitening and maximum likelihood (ML) detection module coupled to the modified DFE and configured to compensate the spatial noise correlation that exists between current set of determined symbols of the equalized X-Pol signal and equalized Y-Pol signal.

7. The communication system of claim 2 further comprising a simplified maximum likelihood (SML) detection module coupled to the modified DFE and configured to compensate the spatial noise correlation that exists between current set of determined symbols of the equalized X-Pol signal and equalized Y-Pol signal.

8. The communication system of claim 7, wherein the SML detection module comprises:

a first SML path comprising:
- a first SML feed-forward filter configured to receive and filter the determined symbols in the equalized Y-Pol signal;
- a first soft and/or hard decision module configured to receive the determined symbols in the equalized Y-Pol signal and make a decision on the determined symbols in the equalized Y-Pol signal;
- a first SML feed-backward filter configured to filter the decision made on the determined symbols in the equalized Y-Pol signal; and
- a first SML adder configured to add the determined symbols in the equalized X-Pol signal received from the modified DFE, add output from the first SML feed-forward filter and subtract output from the first SML feed-backward filter to determine the symbols in the equalized X-Pol signal.

9. The communication system of claim 7, wherein the SML detection module comprises:

a second SML path comprising:
- a second SML feed-forward filter configured to receive and filter the determined symbols in the equalized X-Pol signal;
- a second soft and/or hard decision module configured to receive the determined symbols in the equalized X-Pol signal and make a decision on the determined symbols in the equalized X-Pol signal;
- a second SML feed-backward filter configured to filter the decision made on the determined symbols in the equalized X-Pol signal; and
- a second SML adder configured to add the determined symbols in the equalized Y-Pol signal received from the modified DFE, add output from the second SML feed-forward filter and subtract output from the second SML feed-backward filter to determine the symbols in the equalized Y-Pol signal.

10. The communication system of claim 1, wherein the communication system is at least one of a wireless communication system and an optical communication system.

11. A communication method using a communication system including a modified decision feedback equalizer (DFE), the method comprising:

filtering, by a first feed-forward filter, a current set of symbols in an equalized X-Pol signal;

filtering, by a second feed-forward filter, a current set of symbols in an equalized Y-Pol signal;

filtering, by a first feed-backward filter, a previously decided set of symbols associated with the equalized X-Pol signal;

filtering, by a second feed-backward filter a previously decided set of symbols associated with the equalized Y-Pol signal;

adding, by a first adder, outputs from the first feed-forward filter and the second feed- forward filter; and subtracting, by the first adder, the outputs from the first feed-backward filter and the second feed-backward filter from the addition of outputs from the first feed-forward filter and the second feed-forward filter to determine the symbols in the equalized X-Pol signal.

12. The communication method of claim 11 further comprising:

filtering, by a third feed-forward filter, the current set of symbols in the equalized Y-Pol signal;

filtering, by a fourth feed-forward filter, the current set of symbols in the equalized X-Pol signal;

filtering, by a third feed-backward filter, the previously decided set of symbols associated with the equalized Y-Pol signal;

filtering, by a fourth feed-backward filter, the previously decided set of symbols associated with the equalized X-Pol signal;

adding, by a second adder, outputs from the third feed-forward filter and the fourth feed-forward filter; and subtracting, by the second adder, outputs from the third feed-backward filter and the fourth feed-backward filter from a sum of the outputs from the third feed-forward filter and the fourth feed-forward filter to determine the symbols in the equalized Y-Pol signal.

13. The communication method of claim 12, wherein the first feed-forward filter and the third feed-forward filter are initialized with same filter coefficients.

14. The communication method of claim 12, wherein the second feed-forward filter and the fourth feed-forward filter are initialized with same filter coefficients.

15. The communication method of claim 12, wherein initial filter coefficients of the first feed-forward filter and the third feed-forward filter are different from initial coefficients of the second feed-forward filter and the fourth feed-forward filter.

16. The communication method of claim 12 further comprising compensating, by a two-dimensional (2D) noise whitening and maximum likelihood (ML) detection module coupled to the modified DFE, the spatial noise correlation that exists between current set of determined symbols of the equalized X-Pol signal and equalized Y-Pol signal.

17. The communication method of claim 12 further comprising compensating, by a simplified maximum likelihood (SML) detection module coupled to the modified DFE, the spatial noise correlation that exists between current set of determined symbols of the equalized X-Pol signal and equalized Y-Pol signal.

18. The communication method of claim 17 further comprising:
- receiving and filtering, by a first SML feed-forward filter, the determined symbols in the equalized Y-Pol signal;
- receiving, by a first soft and/or hard decision module, the determined symbols in the equalized Y-Pol signal;
- making a decision, by the first soft and/or hard decision module, on the determined symbols in the equalized Y-Pol signal;
- filtering, by a first SML feed-backward filter, the decision made on the determined symbols in the equalized Y-Pol signal;
- adding, by a first SML adder, the determined symbols in the equalized X-Pol signal received from the modified DFE, and output from the first SML feed-forward filter; and
- subtracting, by the first SML adder, output from the first SML feed-backward filter from a sum of the determined symbols in the equalized X-Pol signal, and output from the first SML feed-forward filter to determine the symbols in the equalized X-Pol signal.

19. The communication method of claim 17 further comprising:
- receiving and filtering, by a second SML feed-forward filter, the determined symbols in the equalized X-Pol signal;
- receiving, by a second soft and/or hard decision module, the determined symbols in the equalized X-Pol signal;
- making a decision, by the second soft and/or hard decision module, on the determined symbols in the equalized X-Pol signal;
- filtering, by a second SML feed-backward filter, the decision made on the determined symbols in the equalized X-Pol signal;
- adding, by a second SML adder, the determined symbols in the equalized Y-Pol signal received from the modified DFE and output from the second SML feed-forward filter; and
- subtracting, by the second SML adder, output from the second SML feed-backward filter from a sum of the determined symbols in the equalized Y-Pol signal and output from the second SML feed-forward filter to determine the symbols in the equalized Y-Pol signal.

20. The communication method of claim 11, wherein the communication method is at least one of a wireless communication method and an optical communication method.

* * * * *